United States Patent [19]

Verhoeff

[11] Patent Number: 4,876,004

[45] Date of Patent: Oct. 24, 1989

[54] TOPOLOGICAL SEPARATOR

[75] Inventor: Abraham Verhoeff, Toronto, Canada

[73] Assignees: Shell Canada Limited, Toronto, Canada; Shell Explorer Limited, Houston, Tex.

[21] Appl. No.: 196,801

[22] Filed: May 16, 1988

Related U.S. Application Data

[63] Continuation of Ser. No. 274,930, Jun. 18, 1981, abandoned, which is a continuation of Ser. No. 111,493, Jan. 10, 1980, abandoned.

[51] Int. Cl.$^4$ .................................................. E02B 3/20
[52] U.S. Cl. ..................................... 210/170; 210/521; 210/522; 405/52; 405/60; 405/63
[58] Field of Search ............... 210/522, 521, 515, 170, 210/500, 767, 923, 242.3

[56] References Cited

U.S. PATENT DOCUMENTS

| | | | |
|---|---|---|---|
| 1,077,308 | 11/1913 | Sargent. | |
| 2,071,320 | 2/1937 | Coberly | 210/57 |
| 2,484,277 | 10/1949 | Fisher | 183/24 |
| 3,779,385 | 12/1973 | Strohecker | 210/154 |
| 3,815,742 | 6/1974 | DuBouchet | 210/800 |
| 3,820,954 | 6/1974 | Stonner et al. | 23/267 R |
| 3,823,828 | 7/1974 | Derzhavets et al. | 210/242 |
| 3,933,654 | 11/1976 | Middelbeek | 210/521 |
| 4,116,789 | 9/1978 | King | 204/180 R |
| 4,202,778 | 5/1980 | Middelbeek | 210/522 |
| 4,209,388 | 6/1980 | De Frautes | 210/170 |

FOREIGN PATENT DOCUMENTS

| | | |
|---|---|---|
| 547608 | 4/1932 | Fed. Rep. of Germany. |
| 2602123 | 7/1977 | Fed. Rep. of Germany. |
| 0138644 | 11/1979 | Fed. Rep. of Germany ...... 210/170 |
| 1466054 | 12/1966 | France. |
| 443601 | 3/1936 | United Kingdom. |

Primary Examiner—Asok Pal

[57] ABSTRACT

An apparatus is provided for removing a floating pollutant such as oil from a liquid such as water by passing the oil and water over the top of a weir and allowing the oil and water to fall between a side of the weir and a baffle closely adjacent to the weir and extending into a pool at the bottom of the weir. Oil collects in a quiet area adjacent the baffle while the water passes over a subsequent weir to removal.

2 Claims, 1 Drawing Sheet

TOPOLOGICAL SEPARATOR

This is a continuation of application Ser. No. 274,930 filed June 18, 1981, now abandoned, which is a continuation of application Ser. No. 111,493, filed Jan. 10, 1980, now abandoned.

BACKGROUND OF THE INVENTION

Most oil/water separators, including parallel plate separators, are based on static settling. The driving force is only the difference in specific gravity between the oil and the water. In the case of oil from tar sands, the specific gravity of the hydrocarbons at room temperature is higher than that of water and only near the boiling point of water is this situation reversed. Due to the limited available driving force because of the relatively low specific gravity differential in a tar sands oil/water system, there inherently are many problems associated with use of prior art separators in such a system, and accordingly the present invention is directed to overcoming this and other problems, as will be apparent hereinafter.

SUMMARY OF THE INVENTION

The present invention pertains to a method for removing a floating pollutant such as oil from the top of a liquid such as water by passing the pollutant and liquid over the top of a weir, dam or barrier; allowing the pollutant and liquid to fall between a side of the weir, dam or barrier and a closely adjacent baffle extending into a downstream pool at the bottom of the weir, dam or barrier; collecting the pollutant and liquid in the pool; allowing the pollutant to separate from the liquid and coalesce in a quieter area adjacent the downstream side of the baffle; and separately removing the liquid from the pool.

Preferably, a pollutant slick retaining baffle is placed extending into the top of the pool at least near the location where the water is withdrawn from the pool, thereby thickening a slick of pollutant between the slick retaining baffle and the baffle closely adjacent the weir dam or barrier In order to obtain a cleaner liquid stream, the preceding steps may be essentially repeated at least once by passing the withdrawn liquid containing a lesser amount of pollutant over the top of at least one succeeding weir, dam or barrier.

DESCRIPTION OF A PREFERRED EMBODIMENT

Figure 1:
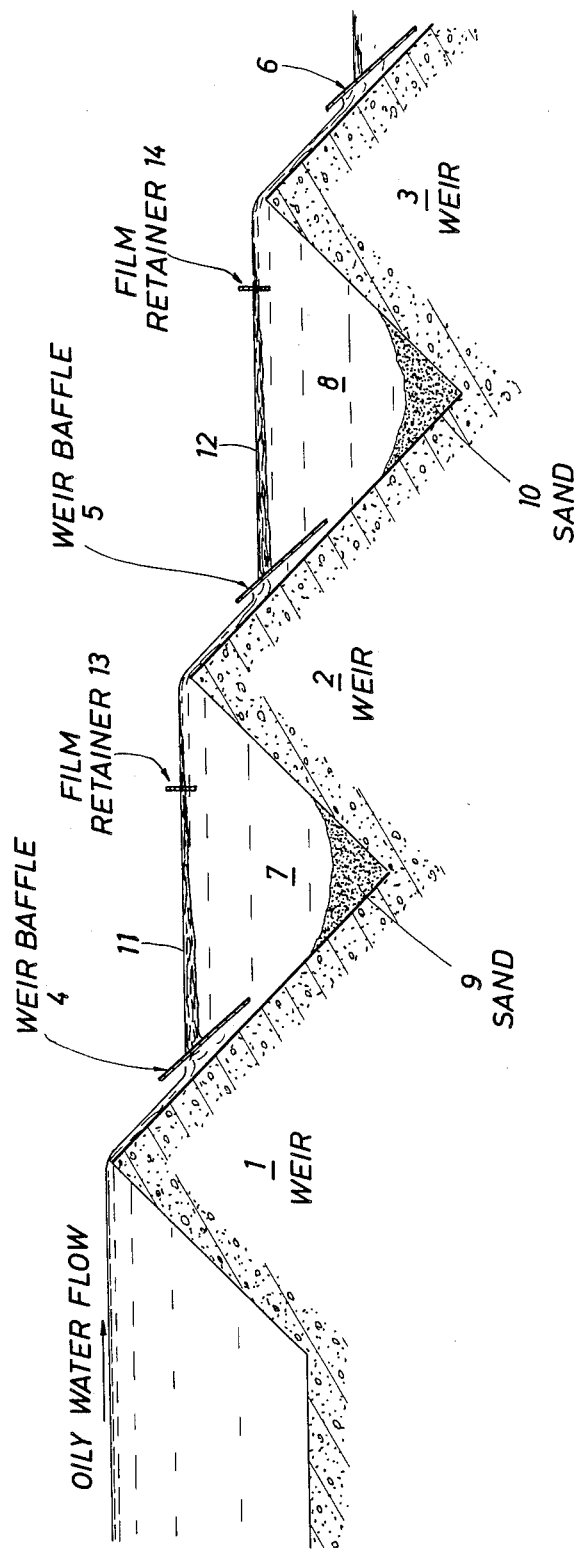
FIG. 1 provides a schematic of a topological separator in accordance with the present invention.

The apparatus of the present invention makes use of flow patterns which efficiently separate a liquid and a floating pollutant, even though the specific gravity differential therebetween is small. As the separation is based on the creation of a new surface above a weir and a collection in a quiet area behind a weir, the separator is termed a topological separator. Hereinafter, the pollutant will be referred to as oil and the liquid will be referred to as water, even though it will be apparent that other liquids and floating pollutants may be separated in accordance with the method and apparatus of the invention.

Referring now to the drawing, FIG. 1 discloses a succession of weirs 1, 2 and 3. However, a single weir, dam or barrier may be utilized with a baffle as hereinafter described to obtain the benefits of the invention. The following description will refer to a weir, although it will be understood that a dam or barrier of various configurations known in the art may be substituted for the weir. In addition, it will be recognized that other pollutants and liquids may be substituted for oil and water, as referred to hereinafter. A preferred cross section of the weirs is essentially triangular (although other shapes may be used) with the apex of each succeeding weir being lower than the apex of the preceding weir. Baffles 4, 5 and 6 are provided on the downstream side of each weir closely adjacent to the weir and extending into pools 7, 8, etc. The oil and water in each case flows over the apex of the weir and between the baffle and the weir and into the pool of oil and water. Sand 9 and 10 is provided at the bottom of pools 7 and 8 to provide a natural contour of the bottom and enhance flow patterns within the pool. By proper design, a "hill" of water near the next weir is formed which limits the extent of the oil slick 11 and 12. To allow more buildup of oil, film retainers, oil slick retainers, or baffles 13 and 14 are placed extending into the top of pools 7 and 8 to retain slicks 11 and 12. Downstream of these barriers, the water stream forms a new surface which runs down the next weir, and so on. Accordingly, the present invention is based on the fact that when water flows over a weir, oil, surfactants, foam, etc. collect and are trapped behind that weir. The especially significant improvement of the present invention involves the addition of the weir baffle so that the collected oil in pools 7, 8, etc. is not entrained in the downcoming oil, etc. on the weir. The removal of oil from this collection zone may be effected in numerous ways well known in the art, e.g., well point suction.

The present invention can be used for the removal of oil from tar sand as above noted. It can also be used for the removal of oil from effluent water of refineries. Such separators would be smaller than separators for tar sand and existing separators which rely on settling by gravity only.

In addition, the invention can be used for the cleanup of oil spills. If a multi-unit weir system is mounted between two pontoons of a vessel or boom, the relative motion between the vessel or boom and water current creates the flow over the weir, thus essentially vacuuming the surface.

The invention is also useful for cleaning the surfaces of creeks in which oil seepages or spills take place, and may be utilized in connection with an existing weir or dam.

Fountains often foam as the moving water concentrates surfactants on newly formed surfaces. Whenever water is removed via an overflow and returned via a filter, a continuous clean-up of the water takes place. A topological separator may be utilized for the clean-up.

The topological separator can also be used for cleaning up drinking water. As rivers and lakes contain a considerable amount of surfactants, debris, etc., the topological separator and aeration will remove most surfactants, etc.

Sewage treatment plants skim fatty material off a liquid surface. A topological separator may be utilized for this operation. A further example of this use is in a slaughter house where the separator can be used to salvage fatty material.

EXAMPLE

An experimental weir system was constructed in the form of a six foot long glass tank, one foot deep and six inches wide. Two weirs formed the weir system, the area between the weirs defining one complete separation cell. The height difference between the weirs was about five inches. Flow was maintained in the system by an external pump which drew from the lowest section of the weir system and delivered through a jet pipe with provision for aeration into the highest. The flow system was closed so that liquid temperature and acidity/alkalinity could be readily controlled.

No attempt was made to feed solids continuously into the system. Samples were placed into the system ahead of the first weir and liquid flow established. Break-up was achieved by a continuation of the jet action of the returning flow and agitation with a paddle.

Best disintegration and separation were achieved when the location and direction of the return flow jet were arranged so as to induce a clockwise eddy current in the section of the weir system ahead of the first weir, with the flow to the weir peeling off the top of this eddy. There was no recirculatory entrainment of surface in the section of the weir system ahead of the first weir and all bitumen floating to the surface was carried over the weir.

It was noted that bitumen floated away from sand and coming to the hot water surface immediately spread into a thin film on the surface. Bitumen droplets produced flecks of oil with maximum oil-water and oil-air interfaces. Because of the relatively low specific gravity differential, not all bitumen droplets surfaced in the section of the weir system ahead of the first weir, and the flow over the first weir contained suspended bitumen as well as clay particles and fine sand.

The weirs were both 45° slopes providing for the establishment of systematic, anticlockwise vertical eddy flows in both downstream areas. The surface hitting the inter-weirs level surface included water and oil flecks and entrained air at the point of entry. It was noted that the oil flecks were not readily re-wetted but retained their air attachment coming to the surface as bubbles and reforming flecks downstream of the weir. Aeration and the upward eddy flow regimes caused the surface separation of more oil.

Surface baffles were placed between the two weirs. A baffle near the upstream weir had the effect of preventing surface oil being re-entrained in the weir induced eddy. Another baffle was placed to prevent surface oil flow over the second. This latter baffle augmented the separating effects of the slight "hill" of water formed at this place.

In use, the weir system produced three "streams". The material floating in the collection zone between the two baffles was designated froth; it was removed quantitatively by skimming with glass plates. The material carried in the circulating flow was designated middlings. This material was sampled from the flowing stream. Material left on the floor of the weir chambers was designated tailings. This was removed quantitatively by sucking them up from the bottom.

In the following experiments, the system was operated with 40 liters of water and 500 gm solid samples. The water was first circulated and heated to 90° C. Thereafter the solid sample was introduced and dispersed over a period of one hour. At the end of this time, the froth was collected and a one liter sample of middlings taken. Tailings from the first well were also collected. Next, the circulating stream containing middlings was diverted and the system filled with clean tap water. Remaining tailings were collected and added to the original recovery.

Recovered froth was dissolved in toluene and distilled to remove water. It was then weighed, ashed and reweighed to give total bitumen and total inorganic contents.

Tailings were dried, weighed and then extracted with trichloroethylene. Bitumen was recovered from the extract and weighed.

The middling sample was filtered and dried. The carbon content of the homogenized clay recovered was determined by the Leco method. The bitumen had a carbon content of 85% and this factor was used to convert carbon contents determined by the Leco method to corresponding bitumen values.

The following run was with a pure tar sand sample and demonstrated good recovery of bitumen in the froth. The separation resulted in a high yield as the minerals in this sample were mainly sand and only 1.86% middlings.

|  | Fractions | | | |
| --- | --- | --- | --- | --- |
|  | Ore | Froth | Middlings | Tailings |
| Fraction, % dry ore | 100 | 12.05 | 1.86 | 86.08 |
| Bitumen, % of fraction | 11.76 | 90.26 | 25.02 | 0.48 |
| Bitumen, % of dry ore | 11.76 | 10.88 | 0.47 | 0.41 |
| Bitumen, % of total Bitumen | 100 | 92.53 | 3.97 | 3.51 |

In the following run, clay lens with low bitumen content was kneaded into the above rich tar sand sample. This sample, which might be representative of a clay material dug from sand interfaces and subject to mechanical handling, gave lower froth recovery and higher middling production. In mining, the scraping action of a bucket wheel will mix clay and sand in a random action.

|  | Fractions | | | |
| --- | --- | --- | --- | --- |
|  | Ore | Froth | Middlings | Tailings |
| Fraction, % dry ore | 100 | 4.57 | 23.89 | 71.54 |
| Bitumen, % of fraction | 7.85 | 85.89 | 15.53 | 0.29 |
| Bitumen, % of dry ore | 7.85 | 3.93 | 3.71 | 0.21 |
| Bitumen, % of total bitumen | 100 | 50.04 | 47.28 | 2.68 |

The clay of the following run was that used to prepare the mixture of the above run.

|  | Fractions | | | |
| --- | --- | --- | --- | --- |
|  | Ore | Froth | Middlings | Tailings |
| Fraction, % of dry ore | 100 | 0.69 | 42.50 | 56.81 |
| Bitumen, % of fraction | 3.94 | 83.45 | 7.43 | 0.37 |
| Bitumen, % of dry ore | 3.94 | 0.58 | 3.16 | 0.21 |
| Bitumen, % of total bitumen | 100 | 14.68 | 80.05 | 5.27 |

The following run with a mixture of tar sand and clay lens explored the effect of alkali (NaoH) addition to the ore, which in the conditioning stage is to reduce the yield of froth and hence of recoverable bitumen.

|  | Fractions | | | |
| --- | --- | --- | --- | --- |
|  | Ore | Froth | Middlings | Tailings |
| Fraction, % of dry ore | 100 | 0.30 | 36.64 | 63.06 |
| Bitumen, % of fraction | 7.57 | 92.35 | 19.49 | 0.23 |
| Bitumen, % of dry ore | 7.57 | 0.28 | 7.14 | 0.15 |
| Bitumen, % of total bitumen | 100 | 3.67 | 94.90 | 1.93 |

The above experiments established that the gentle washing approach of the subject invention was capable of extracting bitumen from both tar sands and tar containing oil/clay lenses in respectable yields.

What is claimed is:

1. Apparatus for collecting a floating pollutant on a liquid surface comprising a weir dam having an upstream side and a sloped downstream side; a first pollutant impermeable baffle closely adjacent to the downstream side of the weir dam; a pool of liquid on the downstream side of said weir dam, said baffle partly extending into the top of the pool of liquid; means for flowing the pollutant and liquid over the weir dam, said baffle partly extending into the top of the pool of liquid; means for flowing the pollutant and liquid over the weir dam, then between the sloped downstream side of the weir dam and the pollutant impermeable baffle and into the pool; a second pollutant impermeable baffle extending into the top of the pool downstream of the first baffle and functionable to collect pollutant between the two baffles; a second weir dam having sloped upstream and downstream sides and being located downstream of the second baffle, the top of the second weir dam being below the top of the first weir dam; and the two dams having a contoured bottom therebetween.

2. The apparatus of claim 1 wherein another baffle is located extending into the top of the pool downstream of the other baffle, and said means for withdrawing pollutant from the pool is located between the baffles.

* * * * *